United States Patent
Vijayakumar et al.

(10) Patent No.: US 8,826,413 B2
(45) Date of Patent: Sep. 2, 2014

(54) WIRELESS LOCAL AREA NETWORK INFRASTRUCTURE DEVICES HAVING IMPROVED FIREWALL FEATURES

(75) Inventors: Rajesh Vijayakumar, San Jose, CA (US); Nicolas S. Dade, Santa Cruz, CA (US); Jacob Thomas, San Jose, CA (US); Anurag Verma, Karnataka (IN)

(73) Assignee: Motorla Solutions, Inc., Schaumburg, IL (US)

( * ) Notice: Subject to any disclaimer, the term of this patent is extended or adjusted under 35 U.S.C. 154(b) by 1008 days.

(21) Appl. No.: 12/649,532

(22) Filed: Dec. 30, 2009

(65) Prior Publication Data

US 2011/0162060 A1 Jun. 30, 2011

(51) Int. Cl.
*G06F 9/00* (2006.01)
*G06F 15/16* (2006.01)
*G06F 17/00* (2006.01)
*H04L 12/413* (2006.01)

(52) U.S. Cl.
CPC .................................. *H04L 12/413* (2013.01)
USPC ................. 726/13; 726/11; 726/14; 370/312; 370/331; 370/338

(58) Field of Classification Search
USPC .................. 726/11, 13, 14; 370/312, 331, 338
See application file for complete search history.

(56) References Cited

U.S. PATENT DOCUMENTS

| | | | |
|---|---|---|---|
| 5,636,345 A * | 6/1997 | Valdevit | 709/224 |
| 6,219,706 B1 * | 4/2001 | Fan et al. | 709/225 |
| 6,463,474 B1 * | 10/2002 | Fuh et al. | 709/225 |
| 7,089,586 B2 | 8/2006 | Kilgore | |
| 7,173,922 B2 | 2/2007 | Beach | |
| 7,173,923 B2 | 2/2007 | Beach | |
| 7,207,061 B2 * | 4/2007 | Martin | 726/11 |
| 7,522,906 B2 * | 4/2009 | Whelan et al. | 455/411 |
| 7,555,772 B2 * | 6/2009 | Shu et al. | 726/11 |
| 7,574,202 B1 * | 8/2009 | Tsao et al. | 455/411 |
| 7,594,259 B1 * | 9/2009 | Audet et al. | 726/11 |
| 7,787,863 B2 * | 8/2010 | van de Groenendaal | 455/411 |
| 7,885,233 B2 | 2/2011 | Nagarajan et al. | |
| 8,040,858 B2 * | 10/2011 | Muhamed et al. | 370/338 |
| 8,060,927 B2 * | 11/2011 | Engdahl et al. | 726/13 |

(Continued)

OTHER PUBLICATIONS

Mishra, A et al. "Intrusion detection in wireless ad hoc networks." IEEE Wireless Communciations Magazine: Feb. 2004. pp. 48-60.*

(Continued)

*Primary Examiner* — Luu Pham
*Assistant Examiner* — Kari Schmidt

(57) ABSTRACT

Methods and systems are provided for improving a firewall implemented at a WLAN infrastructure device (WID). The WID includes a stateful firewall that implements firewall rules based on an ESSID of the WID to specify whether traffic is allowed to or from the ESSID. For example, in one implementation of such a firewall rule, packets that are required to be sent out on all wired ports can be blocked from being flooded out on WLANs (e.g., the packet is allowed to pass only to the wired ports). A method and system are provided for preventing a malicious wireless client device (WCD) that is transmitting undesirable traffic from using RF resources by deauthenticating the malicious WCD to remove it from the WLAN and blacklisting it to prevent it from rejoining the WLAN for a time period. Method and systems are also provided for either "on-demand" and/or predicatively communicating state information regarding an existing firewall session.

9 Claims, 8 Drawing Sheets

(56) References Cited

U.S. PATENT DOCUMENTS

| | | | |
|---|---|---|---|
| 8,204,478 B2* | 6/2012 | Na et al. | 455/411 |
| 2002/0083344 A1* | 6/2002 | Vairavan | 713/201 |
| 2007/0109994 A1 | 5/2007 | Beach | |
| 2007/0177435 A1 | 8/2007 | Beach | |
| 2008/0069065 A1* | 3/2008 | Wu et al. | 370/340 |
| 2008/0092223 A1* | 4/2008 | Setia et al. | 726/11 |
| 2008/0148379 A1* | 6/2008 | Xu et al. | 726/11 |
| 2008/0235755 A1* | 9/2008 | Blaisdell et al. | 726/1 |
| 2009/0016529 A1* | 1/2009 | Gopinath et al. | 380/270 |
| 2009/0019539 A1* | 1/2009 | Jonnalagadda et al. | 726/14 |
| 2009/0034470 A1* | 2/2009 | Nagarajan et al. | 370/331 |
| 2010/0180331 A1* | 7/2010 | Murakami et al. | 726/11 |
| 2011/0004913 A1 | 1/2011 | Nagarajan et al. | |

OTHER PUBLICATIONS

Scarfone, Karen, et al. "Guide to Securing Legacy IEEE 802.11 Wireless Networks." NIST Special Publication 800 (2008): 48.*

Mishra, A et al. "Intrusion detection in wireless ad hoc networks," Wireless Communications, IEEE, vol. 11, No. 1, pp. 48-60, Feb. 2004.*

Scarfone, Karen et al. "Guide to Security Legacy IEEE 802.11 Wireless Networks." NIST Special Publication 800 (2008).48.*

File History for U.S. Appl. NO. 11/831,778, filed Jul. 31, 2007.

* cited by examiner

WIRELESS LOCAL AREA NETWORK INFRASTRUCTURE DEVICES HAVING IMPROVED FIREWALL FEATURES

FIELD OF THE DISCLOSURE

The present invention generally relates to communication networks and, more particularly, to methods, systems and apparatus for improving a stateful firewall implemented at a network infrastructure device, such as a wireless switch (WS) or an access point, in a Wireless Local Area Network (WLAN).

BACKGROUND

A wireless local area network (WLAN) generally includes one or more access points (APs) designed to communicate with wireless client devices. As the number of APs increases, the network can become difficult to manage. To help alleviate this problem, a master controller (also referred to as a "wireless switch") can be added to the network. Each wireless switch has a number of ports which allow the wireless switch to be coupled to multiple APs. A wireless switch controls some or all of the APs in the network, and data going to or from the APs flow through the wireless switch. Moreover, the access points can then be simplified by performing many of the functions of a conventional access point at the wireless switch. These simplified access points are referred to herein as "access ports" to differentiate them from conventional access points.

A firewall is network element that is normally placed at a boundary between a protected network and an unprotected network, and is used to regulate flows of network traffic (i.e., communications) between the networks to prevent network intrusion to the protected network. A firewall can be implemented in either hardware or software running on a computer, or a combination of both. A firewall acts like a gate that ensures that nothing private goes out and nothing malicious comes in. A firewall is designed to inspect all network traffic passing through it (i.e., entering or leaving a protected network), and to deny or allow passage of the traffic based on a set of policies or filtering rules. These policies describe what traffic is authorized (and allowed to pass through the firewall) and what traffic is unauthorized (and will be blocked if it does not meet the specified security criteria). Based on these policies, a firewall can be configured to permit or deny all inbound and outbound traffic between two or more security domains.

In general, firewalls can be classified as being either a stateful firewall or a stateless firewall.

A stateless firewall refers to a firewall that treats each network frame (or packet) in isolation. A stateless firewall has no way of knowing if any given packet is part of an existing connection, is trying to establish a new connection, or is just a rogue packet By contrast, a stateful firewall refers to a firewall that keeps track of the state of each connection (such as Transmission Control Protocol (TCP) streams, and User Datagram Protocol (UDP) communication) traveling across it in memory, and that performs stateful packet inspection (SPI) to distinguish legitimate packets for different types of connections. The state of the connection can include such details as the Internet Protocol (IP) addresses and ports involved in the connection and the sequence numbers of the packets traversing the connection. For protocols that use multiple connections (e.g., the file transfer protocol (FTP) or the session initiation protocol (SIP)), a stateful firewall maintains a table of open connections and intelligently associates new connection requests with existing legitimate connections. When a client initiates a new connection, it sends a packet with a synchronization (SYN) bit set in the packet header. All packets with the SYN bit set are considered by the firewall as new connections. If the service which the client has requested is available on the server, the service will reply to the SYN packet with a packet in which both the SYN bit and the acknowledgement (ACK) bit are set. The client will then respond with a packet in which only the ACK bit is set, and the connection will enter the established state. Such a firewall will pass all outgoing packets through but will only allow incoming packets if they are part of an established connection, ensuring that hackers cannot start unsolicited connections with the protected machine. After setup of the connection all packets thereafter (for that session) are processed rapidly due to the simplicity and speed of determining whether each packet belongs to an existing, pre-screened session. By keeping track of the connection state, stateful firewalls provide added efficiency in terms of packet inspection. This is because for existing connections the firewall need only check the state table, instead of checking the packet against the firewall's rule set, which can be extensive. Only packets matching a known connection state will be allowed by the stateful firewall; others will be rejected. Once the session has ended, its entry in the state-table is discarded.

To enhance network security, a firewall can be implemented at an access point or at a wireless switch. Such firewalls can implement access control lists (ACLs) and/or stateful firewall policies to control what traffic is allowed to flow through a network. For example, some wireless switches and access points (APs) implement preferred ACLs. Because ACLs are stateless, APs don't have to worry about sharing firewall session information across APs when a user roams from one AP to another. However, this comes at the cost of security since ACLs may cause the opening up of a network much more widely than a stateful firewall.

Some wireless switches and APs implement stateful firewall policies that maintain session state information such as for TCP, UDP, Internet Control Message Protocol (ICMP), Internet Group Management Protocol (IGMP), and the like. Stateful firewall policies can provide better security protection than ACLs. For example, when a wireless client device roams between two APs managed by the same wireless switch all traffic flows through the wireless switch. However, when a wireless client device roams between two APs managed by two different wireless switches large amounts of session information must be synchronized between the different wireless switches.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
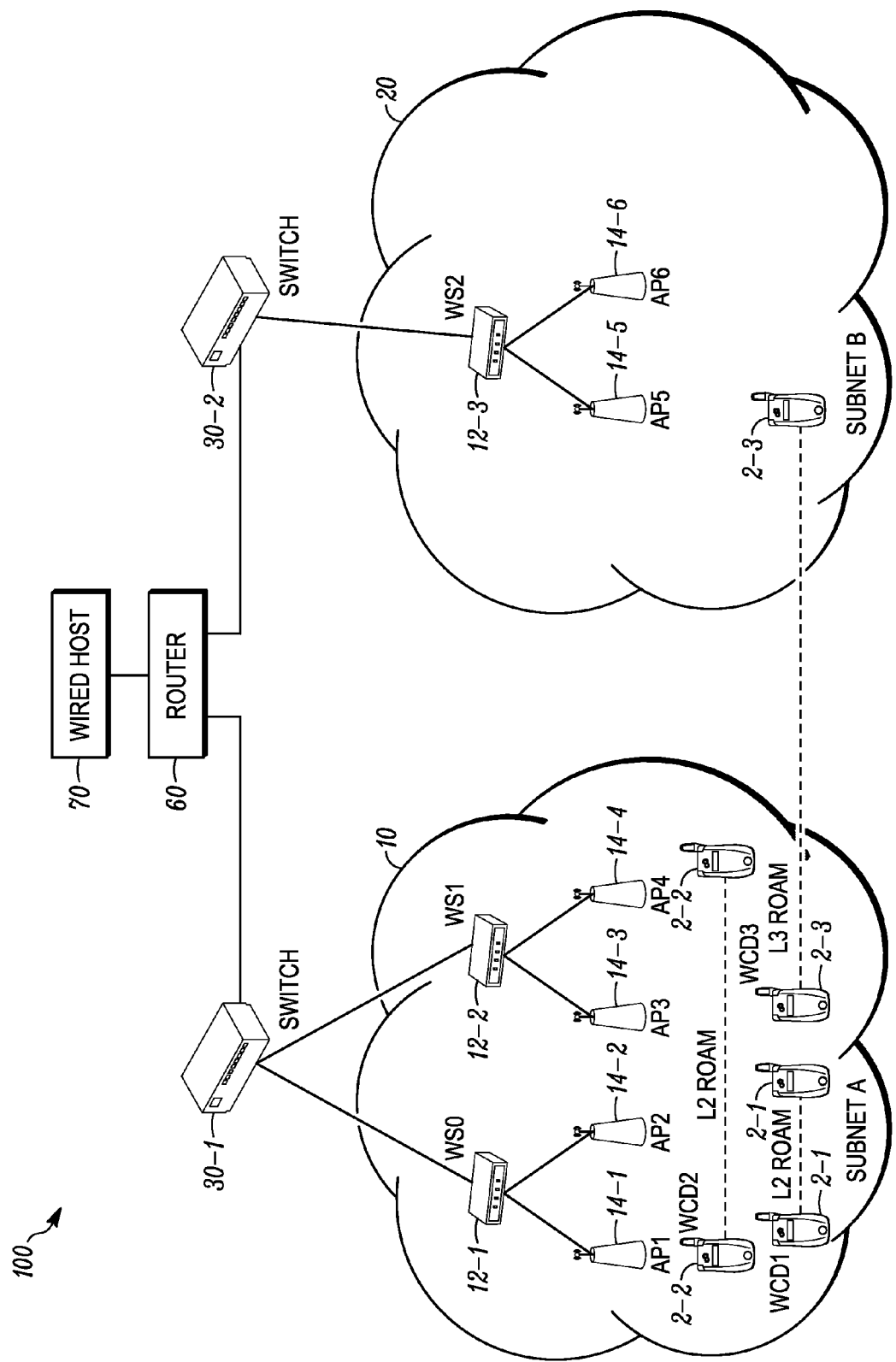
FIG. 1 is a simplified block diagram of a network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Overview

In accordance with the disclosed embodiments, methods and systems are provided for improving a firewall implemented at a WLAN infrastructure device (WID). The WID may be an access point that wirelessly communicates with wireless client devices over an RF link, or may be implemented via a wireless switch that is coupled to one or more access ports that are designed to wirelessly communicate with wireless client devices over an RF link.

In accordance with some of the disclosed embodiments, a method and system are provided that includes a WLAN infrastructure device (WID). The WID includes a plurality of wired ports including a first wired port that is designed to receive packets for delivery to a wireless client device over an RF link. The WID can receive a packet from the first wired port or from a wireless client device over an RF link.

The WID includes a stateful firewall that is designed to receive the packet from the WID and to enforce a policy with respect to the packet. The policy comprises firewall rules that are defined based on a WLAN parameter that is exclusive to a wireless domain, such as an Extended Service Set IDentifier (ESSID) of the WID. Each WID can support multiple WLANs each having its own ESSID that identifies that particular WLAN. In one example that follows, the WID includes a first ESSID that identifies a first WLAN of the WID, and a first firewall rule implemented at the stateful firewall is defined based on the first ESSID of the WID. The first firewall rule specifies whether traffic is allowed to and/or from the ESSID.

In one implementation, the first firewall rule is defined based on a source address of the packet, a destination address of the packet, a protocol applicable to the packet (and a corresponding destination port), and an action. The action corresponds to the source address, the destination address, and the protocol (and the corresponding destination port). Either the source address or the destination address of the packet corresponds to the first ESSID. In one implementation, the action specifies that any packet having the protocol and the corresponding destination port is either allowed to pass through the stateful firewall, or blocked from passing through the stateful firewall.

In some implementations, based on the action specified in the first firewall rule, the stateful firewall can determine whether to: (1) allow the packet to pass through the firewall to all destination ports of the WID, (2) block the packet from passing through the firewall, or (3) allow the packet to pass through the firewall to selected destination ports of the WID.

In one implementation, the WID can receive a first packet on the first wired port for transmission to the wireless client device over an RF link. In this implementation, the first packet has a destination address that corresponds to the first ESSID, and has a protocol type that is either a broadcast or a multicast type protocol. Packets of these protocol types are normally sent to all ports of the WID. However, a first firewall rule is provided that includes a first action specifying that any packet having a broadcast or multicast destination address is to be blocked from passing through the stateful firewall to the WLAN specified via the first ESSID. In accordance with the first firewall rule, broadcast and multicast packets are required to be sent out on all wired ports, but can be blocked from being flooded out on WLANs (e.g., the packet is allowed to pass only to the wired ports). In this manner, based on the action specified in the first firewall rule, the stateful firewall can be designed to: (1) allow the packet to pass through the firewall to all ports of the WID, (2) block the packet from passing through the firewall, or (3) allow the packet to pass through the firewall to wired ports of the WID and block the packet from being sent out on a WLAN specified via the ESSID In accordance with some of the other disclosed embodiments, a method and system are provided for preventing a malicious wireless client device from using RF resources. A firewall at a WLAN infrastructure device (WID) processes incoming packets from a wireless client device to determine whether the wireless client device is a malicious wireless client device that is transmitting undesirable traffic. For example, to determine whether the wireless client device is a malicious wireless client device the firewall may process the incoming packets to determine whether the incoming packets have a known attack signature, to determine whether the incoming packets correspond to a certain type of traffic, or to determine whether the incoming packets exceed a predetermined amount of traffic. When the firewall determines that the wireless communication device is a malicious wireless communication device (WCD) (e.g., when the incoming packets have a known attack signature, or correspond to a certain type of traffic, or exceed a predetermined amount of traffic), the firewall can send an instruction to the WID that instructs the WID to transmit a deauthentication frame to the malicious WCD to remove from the WLAN, and to blacklist the malicious WCD to prevent it from rejoining the WLAN for a time period while the WID attempts to authenticate the malicious WCD. When authentication of the malicious wireless client device is not successful, the WID blocks the malicious wireless client device from joining the WLAN. When authentication of the malicious wireless client device is successful, the WID may allow the malicious wireless client device to join the WLAN.

In accordance with some of the other disclosed embodiments, a method and system are provided for communicating state information "on-demand" when a wireless client device roams from a first access point to a second access point. The first access point maintains state information regarding an existing firewall session associated with the wireless client device. When the wireless client device roams from the first access point to the second access point, the second access point requests the state information regarding the existing firewall session (associated with the wireless client device from the first access point) from the first access point, and in response to the request, the first access point communicates the state information to the second access point.

In accordance with some of the other disclosed embodiments, a method and system are provided for predicatively communicating state information regarding existing firewall sessions between a first access point that a particular wireless client device is currently associated with and other access points in a network of access points.

Each access point in a network of access points maintains state information regarding existing firewall sessions associated with each wireless client device that is currently associated with that access point.

When a WCD roams from the first access point to one of the other APs, then the one of the other APs that the WCD roamed to can request session information (e.g., table of session table entries for the WCD) for that WCD from the first access point. The first access point will respond and send the requested session information the AP that sent the request.

The first AP derives roaming information learned by the first access point based on the roaming history of other WCDs that have roamed away from first access point. For example, based on a request from a second access point for the session information, the first access point can determine that the second access point is a potential candidate for WCDs to roam to from first access point.

Each time the first access point migrates session information to a neighbor AP, the first access point updates a list of predicted candidate APs. For example, in one implementation, the first access point maintains the list of predicted candidate APs over time (e.g., in storage at the first access point) by regularly updating the list of predicted candidate APs based on roaming information it has learned. The list of predicted candidate APs identifies particular ones of the other APs in the network of APs that first access point has migrated session information to when wireless communication devices associated with the first access point have roamed to the other APs after being associated with the first access point. As such, the list of predicted candidate APs identifies particular ones of the other APs in the network of APs that WCDs currently associated to first access point are likely to roam to from first access point. Thus, based on roaming patterns of other WCDs that have been associated with the first access point and then roamed away, the first access point can predict that a particular wireless communication device currently associated with first access point will also roam to one of the other APs on the list of predicted candidate APs.

Prior to the time that a particular WCD roams away from the first access point, the first access point communicates state information regarding an existing firewall session (associated with the particular wireless communication device that the first access point has an active firewall session with) to the predicted candidate APs on the list of predicted candidate APs. In other words, the first access point can communicate this state information prior to the time when a particular wireless communication device roams away from the first access point to another AP on the list of predicted candidate APs so that state information regarding the existing firewall session associated with particular wireless communication device can also be maintained at selected APs of the network of APs (i.e., at those APs that are in the list of predicted candidate APs).

Prior to describing some embodiments of the embodiments with reference to FIGS. 3-9, an example of a network 100 and an example of a wireless switch 200 will be described with reference to FIGS. 1 and 2, respectively.

FIG. 1 is a simplified block diagram of a network 100. In this particular example, the network 100 includes a wireless local area network (WLAN) that includes wireless client devices (WCDs) 2, and wireless switches 12 that are each coupled to one or more access ports (APs) 14. The network 100 also includes layer 2 (L2) switches 30 coupled to wireless switches 12, a layer 3 (L3) router 60 coupled to the L2 switches 30, and a wired host 70 that is communicatively coupled to the L3 router 60. As used herein, the term "Wireless Local Area Network (WLAN)" refers to a network in which a mobile user can connect to a local area network (LAN) through a wireless (radio) connection. The IEEE 802.11 standards specify some features of wireless LANs. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA, and all IEEE standards published at the time this application was filed are incorporated herein by reference in their entirety.

In this particular non-limiting example of one network configuration, the L2 switch 30-1 is coupled to the wireless switches 12-1, 12-2, which are coupled to the access ports (APs) 14-1/14-2 and 14-3/14-4, respectively, and supports a first subnet (A) 10. The L2 switch 30-2 is coupled to the wireless switch 12-3, which is coupled to the APs 14-5, 14-6, and supports the second subnet (B) 20. Each of the L-2 switches 30-1, 30-2 defines its own Virtual Local Area Network (VLAN) (not shown). As used herein, the term "Virtual Local Area Network (VLAN)" refers to group of ports on an Ethernet switch that behaves like a separate network segment. VLANs allow networks to be segmented logically without having to be physically rewired. Instead of having all ports on a switch be equal and belong to the same network, ports can be segregated into groups, each belonging to a separate logical network. VLANs subdivide a physical local area network into multiple virtual local area networks or multiple smaller broadcast domains without needing additional network devices, such as routers, to do this. One switch may have several VLANs defined on it. A VLAN is identified using a special identification number called a VLAN ID. Stations attached to switch ports having the same VLAN ID act and function as though they are all on the same physical network segment. The VLAN ID is transmitted in every packet associated with that VLAN.

The wireless switches 12 communicate with the wireless client devices 2 via access ports (APs) 14. The wireless client devices 2 can physically move around the WLAN, and communicate with an IP network via the access ports 14. As used herein, a "wireless client device" can generally refer to a portable or "mobile" wireless communication device or other hardware designed to communicate over a wireless channel. A wireless client device can physically move around, but at any given time may be mobile or stationary. The WCDs 2 illustrated in FIG. 1 can be any one of a number of different types of mobile computing devices, which include without limitation, mobile stations (e.g. mobile telephone handsets, mobile radios, mobile computers, laptop computers, a personal computer (PC) card, personal digital assistants (PDAs), or the like), computers, wireless gaming devices, access terminals, subscriber stations, user equipment, compact flash, external or internal modem, or any other devices configured to communicate via wireless communications. Although not illustrated in FIG. 1, the WCDs 2 can comprise one or more processors/controllers, transceivers, and/or other suitable components. WCDs are well-known in the art and therefore will not be described in detail herein.

Although FIG. 1 illustrates a particular WLAN architecture that employs access ports 14 that are coupled to wireless switches 12, it will be appreciated that other WLAN architectures in which access points are utilized may be implemented without wireless switches. As used herein, the terms "access point" or "access port" both refer to a network-capable device containing a transceiver and antenna for transmitting signals to and receiving signals from the WCDs 2. Access point and access port devices both allow wireless stations to be quickly and easily connected to a wired local area network (LAN) enabling WCDs 2 to communicate with the LAN, and thus provide a "point of access" to the wired network for the WCDs. Although not illustrated in FIG. 1, those skilled in the art will appreciated that each access point or access port device can serve multiple wireless client devices within a defined network area.

While an access point device and an access port device include many similarities, there are significant differences between the two types of devices. One difference is that access ports 14 (sometimes referred to as thin access points) are usually implemented in conjunction with a wireless switch (or other centralized controller). The access ports 14 differ from regular or "fat" access points in that access ports have reduced Media Access Control (MAC) functionality, whereas regular access points have full MAC functionality. In other words, in a WLAN that implements a wireless switch/access port architecture, many of the higher level MAC functions that would be implemented in an access point are implemented at the wireless switch instead. The wireless switch provides a single point of administration for all thin access ports it configures, controls, manages, and secures the environment for these thin access ports. By contrast, a fat access point is usually implemented without a wireless switch, and has sufficient program logic and processing power to allow it to enforce policies relating to access and usage, rather than working under the supervision of a centralized controller (e.g., wireless switch). A fat access point directly serves as the point of interconnection between the WLAN and a fixed wire network and allows wireless communication devices to be quickly and easily connected to a wired LAN. In the fat access point embodiments, the wireless protocol terminates at the access point as opposed to the wireless switch (as is the case in a wireless switch/access port architecture that is illustrated in FIG. 1).

The wireless switch devices 12 are coupled to at least one access port (AP) (and possibly multiple APs). For sake of simplicity, in FIG. 1 each of the wireless switches 12 is shown as having two APs associated therewith. However, it will be appreciated that, while not shown in FIG. 1, each of the wireless switches can have less than two APs or more than two APs associated therewith.

As used herein, the term "wireless switch device" refers to a network entity that configures, controls, and manages a plurality of access ports. Examples of wireless switch devices are disclosed in, for example, U.S. Pat. No. 7,173,922, entitled "Multiple wireless local area networks occupying overlapping physical spaces" assigned to the assignee, its contents being incorporated by reference in its entirety herein; and U.S. Pat. No. 7,173,923, entitled "Cell Controller Adapted to Perform A Management Function" assigned to the assignee, its contents being incorporated by reference in its entirety herein. In U.S. Pat. Nos. 7,173,922, and 7,173,923, a wireless switch is referred to as a cell controller. Wireless switches are also described, for example, in United States Patent Application Publication Number US 2007/0177435A1, filed Jan. 11, 2007, entitled "System For Multiple Wireless Local Area Networks," and assigned to the assignee of the present invention, which is incorporated herein by reference in its entirety; United States Patent Application Publication Number 2007/0109994A1 entitled "Cell Controller For Multiple Wireless Local Area Networks," filed Jan. 11, 2007, which is incorporated by reference herein in its entirety; United States Patent Application Publication Number US20090034470A1, filed published Feb. 5, 2009, entitled "Forwarding Broadcast/Multicast Data When Wireless Clients Layer 3 Roam Across IP Subnets In A WLAN," and assigned to the assignee of the present invention, which is incorporated herein by reference in its entirety; and U.S. patent application Publication Ser. No. 11/831,781 entitled "Architecture For Seamless Enforcement Of Security Policies When Roaming Across IP Subnets In IEEE 802.11 Wireless Networks," assigned to the assignee of the present invention and filed Jul. 31, 2007, which is incorporated by reference herein in its entirety.

As described, for example, in U.S. Pat. No. 7,173,923, much of the MAC layer functionality that was traditionally provided at a conventional access point can be implemented in the wireless switch device so that "dumb" or "thin" access ports can be used instead of "smart" or "thick" access points. As mentioned above, a wireless switch can be coupled to one or more access ports. A wireless switch can simultaneously support a plurality of ESSIDs. A wireless switch will be described below with reference to FIG. 2.

The wired Layer 2 (L2) switch devices 30 (also known as an Ethernet switches) are networking devices that operate at Layer 2, sometimes referred to as the Data Link Layer, of the well-known seven layer Open Systems Interconnection (OSI) communication model. A wired L2 switch typically provides wired networking services/functions and features such as Layer 2 Ethernet switching, Layer 3 routing, firewall service, etc. As such, a wired L2 switch typically includes wired input/output interfaces such as Ethernet ports, token ring ports, etc., and includes modules for performing packet forwarding. A wired L2 switch typically receives data packets and forwards them based on information contained in their headers, which for a wired L2 switch are headers corresponding to L2 wired networking protocols including IEEE 802.3 Ethernet, IEEE 802.5 token-ring, and the like.

The L3 router 60 provides connectivity to a wired host 70 for the rest of the network. Each interface on the router 60 is associated with an independent IP subnet (e.g. subnet A, subnet B) as shown in FIG. 1. Traffic that goes between interfaces (i.e. between IP subnets) is routed using standard rules of IP. The wired host system 70 can be, for example, a workstation, any application server including mail server, web server, file server, Domain Name System (DNS) server, streaming video server, instant messaging server, gaming server, multicast server that generates multicast information, and the like.

Figure 2:
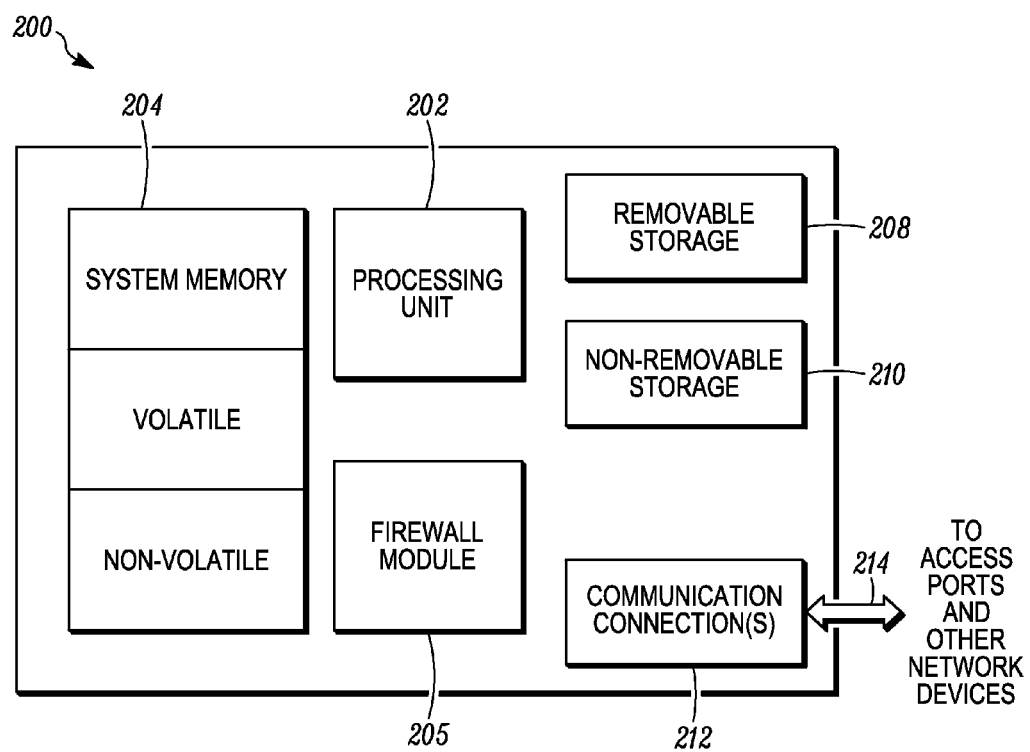
FIG. 2 is a simplified block diagram of a wireless switch.

FIG. 2 is a simplified block diagram of a wireless switch 200. It will be appreciated by those of ordinary skill in the art that wireless switch 200 is only one example of a wireless switch and is not intended to suggest any limitation as to the scope of use or functionality of the invention. Other well known configurations that may be suitable for use with the invention include, but are not limited to, personal computers (PCs), server computers, multiprocessor systems, microprocessor-based systems, programmable consumer electronics, network PCs, minicomputers, mainframe computers, distributed computing environments that include any of the above systems or devices, and the like.

Wireless switch 200 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Wireless switch 200 typically includes at least some form of computer readable media. Computer readable media can be any available media that can be accessed by wireless switch 200 and/or by applications executed by wireless switch 200. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, random-access memory (RAM), Read-only memory (ROM), electrically erasable programmable read-only memory (EEPROM), flash memory or other memory technology, Compact Disc Read Only Memory (CD-ROM), digital versatile disks (DVD) or other optical storage, magnetic cassettes, magnetic tape, magnetic disk storage (e.g., hard disks) or other magnetic storage devices (e.g., Magneto resistive Random Access Memory (MRAM)), or any other medium which can be used to store the desired information and which can accessed by wireless switch 200. Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal.

Referring again to FIG. 2, in its most basic configuration, wireless switch 200 typically includes at least one processing unit 202 and memory 204. Depending on the exact configuration and type of computing system 200, memory 204 may be volatile (such as random access memory (RAM)), non-volatile (such as a hard disk, ROM, flash memory, etc.) and most often some combination of the two. Additionally, wireless switch 200 may also have additional features/functionality. For example, wireless switch 200 may also include additional storage (removable and/or non-removable) including, but not limited to, magnetic or optical disks or tape. Such additional storage is illustrated in FIG. 2 by removable storage 208 and non-removable storage 210. Memory 204, removable storage 208, and non-removable storage 210 are all examples of computer storage media as defined above.

Wireless switch 200 also includes a firewall module 205 that can be implemented at the processing unit 202 and memory 204, but is shown separately for sake of clarity. As will be described below with reference to FIGS. 3-6, for example, some of the various embodiments described herein are implemented at the firewall module 205.

Wireless switch 200 also includes communications connection(s) 212 that allow the system to communicate with other network devices, such as access ports (APs) 14 and layer 3 routers 60, over interfaces 214. Communications connection(s) 212 may be associated with the handling of communication media as defined above. In one embodiment each communications connection(s) 212 can include one or more network adapters that include transceiver and modem functionality. As used herein, the term "network adapter" can refer to computer hardware designed to allow computers to communicate over a computer network. The network adapters can comprise, for example, a communications modem, wired and/or wireless transceivers, and/or any other devices that can communicate over, for example, an IP network.

A wireless switch device can include wired Ethernet interfaces for a plurality of access ports it supports, and serves as a termination point for a "wireless" protocol, such as the IEEE 802.11 protocol. To explain further, client device(s) communicate with an AP over the air via wireless packets (e.g., IEEE 802.11 data packets), and the AP passes the wireless packets to the wireless switch over a wire that connects the wireless switch and the AP. In other words, the wireless switch communicates wireless packets encapsulated in wired packets (e.g., IEEE 802.11 packets encapsulated in IEEE 802.3 packets) with the AP. A wireless switch device receives data packets, going to and/or received from one of its connected access ports, and processes those data packets, which would have traditionally been processed by a "thick" access point. A packet forwarding module of a wireless switch device forwards those data packets based on information contained in their L2 headers, which for a wireless switch are headers corresponding to L2 wireless networking protocols including IEEE 802.11, etc. For instance, in the context of IEEE 802.11 networks, a wireless switch decapsulates inbound IEEE 802.11 data packets received from client device via an access port into IEEE 802.3 packets, and converts/encapsulates outbound IEEE 802.3 packets destined for a client device into IEEE 802.11 data packets before passing them on to an AP for transmission to the wireless client device. The wireless switch then Layer-2 switches the resulting 802.3 packet onto the wire. If the 802.3 packet is destined to the wireless switch itself, then the wireless switch routes the IP packet based on its "routing table." In addition to Layer 2 (L2) switching and Layer 3 (L3) or IP routing of data packets, a wireless switch (WS) also performs a number of additional services/functions including, but not limited to, networking services, wireless services, configuration services, security services, administration services, application services, high availability services, packet forwarding services, and system management services.

Examples of the networking services/functions include Layer 2 interface management of physical ports, Layer 3 interface management of IP Interfaces, Domain Name System (DNS) service, Dynamic Host Configuration Protocol (DHCP) Client, DHCP Server, and route-table management. Examples of the wireless services/functions include access port configuration services/functions, access port management services/functions, wireless client device configuration services/functions, wireless client device database management services/functions, WLAN configuration services/functions, WLAN management services/functions, Layer 3 or IP mobility service, and wireless hotspot service. Examples of the configuration services/functions include configuration management, and firmware image management. Examples of the security services/functions include security functions (such as IEEE 802.11i, IP Security (IPsec), Virtual Private Network (VPN), Secure Sockets Layer (SSL) VPNs, Disk Operating System (DOS) Attack detection, Wireless Intrusion Detection System (WIDS) functions, stateful and stateless packet filtering using access-lists, firewall services/functions (e.g., role-based firewall), Authentication/ Authorization/Accounting (AAA) client, Remote Authentication Dial In User Service (RADIUS) Server (or a AAA server), user management, and password management. Examples of the administration services/functions include Command Line Interface (CLI), Simple Network Management Protocol (SNMP) server, monitoring, events, alarms, Telnet/secure shell (SSH)/Hypertext Transfer Protocol (HTTP), Hypertext Transfer Protocol over Secure Socket Layer (HTTPS), Trivial File Transfer Protocol (TFTP), File Transfer Protocol (FTP), Secure Copy protocol (SCP), SSH File Transfer Protocol (SFTP) services/functions, certificate management, syslog server, debugging, tracing, and archiving. Examples of the application services/functions include Network Time Protocol (NTP) server, real time locationing system, health checking, and statistics. Examples of the high availability services/functions include Virtual Router Redundancy Protocol (VRRP) and clustering service. Examples of the packet forwarding services/functions include Layer 2 (L2) switching/bridge modules and Layer 3 (L3) or IP routing modules mentioned above, as well as a wireless (IEEE 802.11) packet forwarder module and a flow or session table forwarding module. Examples of the system management services/functions include process monitoring for monitoring all other processes running in the system, Central Processing Unit (CPU) management, and memory management.

Roaming

Mobility is a key driver in the deployment of wireless networks. WLANs can give wireless client devices the ability to "roam" or physically move from place to place without being connected by wires. In the context of WLANs, the term "roaming" generally describes the physically movement of a wireless client device between APs that are part of the same subnet or between APs that are part of different subnets. FIG. 1 illustrates the concept of the wireless client devices 2-1, 2-2 performing a layer 2 roaming and the concept of wireless client device 2-3 performing layer 3 roaming A layer 2 (L2) network is defined as a single IP subnet and broadcast domain, such as the first subnet (A) 10, while a layer 3 (L3) network is defined as the combination of multiple IP subnets and broadcast domains, such as the first subnet (A) 10 and the second subnet (B) 20.

In a local area network (LAN) or other network, the Media Access Control (MAC) address is a host computer's unique hardware number. A wireless switch device 12 can redirect communications at the layer 2 level, using the destination MAC address of a WCD to determine where to direct the communication.

A WCD 2 continuously listens to nearby APs and can decide to roam if it finds an AP with the same SSID and a stronger signal or is experiencing too much loss with the current AP 14. To initiate a roam, the client 2 sends an associate (or re-associate) request to the new AP 14. It may disassociate from the old AP 14, or the old AP 14 may notice the client 2 is no longer there. As shown in FIG. 1, layer 2 (L2) roaming occurs when WCD 2-1 moves far enough away from its AP 14-1 such that its radio associates with a different AP 14-2 in the same subnet 10. In other words, WCD 2-1 disconnects from AP 14-1 and connects to another AP 14-2 in the same subnet (broadcast domain) where several APs use the same Service Set Identifier (SSID); the SSID is a sequence of alphanumeric characters (letters or numbers) which specify the name of a wireless local area network (WLAN) and allows one wireless network to be clearly distinguishable from another. Similarly, L2 roaming also occurs when WCD 2-2 moves far enough away from its AP 14-1 such that its radio associates with a different AP 14-4 in the same subnet (even though on a different wireless switch 12-2). WCD 2-2 disconnects from AP 14-1 and connects to another AP 14-4 in the same subnet 10.

With layer 2 (L2) roaming, APs inside a given subnet share the same Extended Service Set (ESS), and although the physical point of attachment (the AP) changes, because the original and the new AP offer coverage for the same IP subnet, the device's IP address is still valid after the roam and can remain unchanged. For example, when the wireless client device 2 roams within the first subnet (A) 10, the IP address of the wireless client device 2 will remain the same.

After a wireless client device 2 successfully roams, LAN traffic for the wireless client device 2 can be relayed through the new AP. However, because the scalability of subnets is limited by the number of APs and clients that can be supported within a given subnet, in some situations the client, such as WCD 2-3, roams to a new AP, such as AP 14-5, in a different or foreign subnet supported by another wireless switch, such as WS 12-3.

As illustrated in FIG. 1, layer 3 (L3) roaming occurs when a wireless client device 2-3 moves from an AP 14-3 within its home IP subnet, such as the first subnet (A) 10, to a new AP 14-5 within a foreign IP subnet, such as the second subnet (B) 20. This foreign IP subnet has a different Basic Service Set (BSS) than the home IP subnet. The wireless client device 2-3 disconnects from one AP 14-3 and connects or re-associates with another foreign AP 14-5 in a foreign IP subnet outside its home IP subnet. In this association, the wireless client device 2-3 is supposed to be served by a different access router (through the foreign AP), which bares a different IP address, while the wireless client device 2-3 itself preserves its original IP address. Because the wireless client device cannot be identified by its original home IP address anymore, to maintain an IP-connection while roaming, a new IP address is required for the routing the client's IP data. Various mechanism for seamlessly obtaining a new IP address which is valid in the new subnet, are described, for example, in United States Patent Application Publication Number US20090034470A1, published Feb. 5, 2009, entitled "Forwarding Broadcast/Multicast Data When Wireless Clients Layer 3 Roam Across IP Subnets In A WLAN," and assigned to the assignee, which is incorporated herein by reference in its entirety.

Implementing ACLs and stateful firewall policies at a wireless switch or access point presents a number of challenges. Many conventional firewall features were designed with a wired network in mind and fail to take into account features of a wireless network. In accordance with the disclosed embodiments, enhancements and techniques are provided for improving a stateful firewall implemented at a WLAN infrastructure device (WID) such as a wireless switch or access point. Various embodiments of the disclosed embodiments will now be described below with reference to FIGS. 3-9.

Specifying Firewall Policies/Rules Based on WLAN Parameters

Wireless switches and APs usually have one or more ESSIDs that are used to define WLANs associated therewith. However, stateful firewall policies on infrastructure devices (e.g., a wireless switch or AP) are not defined or specified in terms of ESSIDs. Instead, the administrator has to define or specify stateful firewall policies and rules in terms of MAC addresses, IP addresses, UDP/TCP ports, VLANs, etc. A typical firewall policy is illustrated in Table 1 below.

TABLE 1

| Rule Number | Source | Destination | Protocol and (destination port) | Action |
| --- | --- | --- | --- | --- |
| 1 | 10.10.1.0/24 | any | HTTP (80) | allow |
| 2 | 157.238.50.0/24 | any | HTTP (80) | allow |
| 3 | any | 10.10.1.0/24 | SSH (22) | deny |
| 4 | any | 157.238.50.0/24 | SSH (22) | deny |
| ... | ... | ... | ... | ... |
| N | ... | ... | ... | ... |

The firewall policy in Table 1 includes a rule/policy number column, a source address column, a destination address column, a protocol (and corresponding destination port) column, and an action column. Each rule/policy specifies an action (specified in the action column) to be taken by the firewall with respect to a packet that is of a certain protocol (with destination port specified in the protocol column) from a source address (specified in the source address column) to a destination address (specified in the destination address column) Each rule/policy can specify firewall rules to allow or deny protocols, ports and/or IP addresses. For instance, some of the firewall rules can determine the destination IP address of the packet, and take an action based on that destination IP.

In the example of Table 1, rule number 1 will apply to packets with a source IP address in the 10.10.1.0/24 subnet, to any destination IP address, and destination port 'http' (TCP port 80) Any connection requests that match this rule are allowed to pass through the firewall.

Likewise, rule number 2 will apply to packets with a source IP address in the 157.238.50.0/24 subnet, to any destination IP address, and destination port 'http' (TCP port 80). Any connection requests that do not match rule 1 but match rule 2 are allowed to pass through the firewall. Rule number 3 will apply to packets with any source IP address, destination IP address in the 10.10.1.0/24 subnet and destination port of 'SSH' (TCP port 22). Any connection requests that do not match rule 1 and rule 2, but match rule 3 will be denied or blocked. Similarly, rule number 4 will apply to packets with any source IP address, destination IP addresses in the 157.238.50.0/24 subnet and destination port of 'SSH' (TCP port 22). Any connection request that does not match rules 1, 2 and 3 but matches rule 4 will be denied or blocked.

This means that with conventional stateful firewalls the WLAN administrator must determine which IP addresses or MAC addresses are being used on that WLAN, and then create policy rules in terms of the IP or MAC addresses that will be used on the WLAN. This results in unnecessarily complex rules since a WLAN can contain many possible subnets.

In accordance with the disclosed embodiments, firewall policies and rules can be specified using WLAN parameters, such as ESSID, in addition to traditional parameters, such as IP addresses, MAC addresses, and the like. The disclosed embodiments allow a WLAN administrator to specify firewall policies and actions in terms of WLAN parameters rather than forcing them to specify firewall policies and actions in terms of IP or MAC addresses. This allows a network administrator to define firewall rules using these WLAN parameters in addition to traditional parameters like IP address, MAC address, and the like. This allows for a more natural expression of the firewall policy in a wireless LAN. The WLAN administrator no longer has to translate the WLAN into all possible IP addresses or MAC addresses that could show up on that WLAN.

Figure 3:
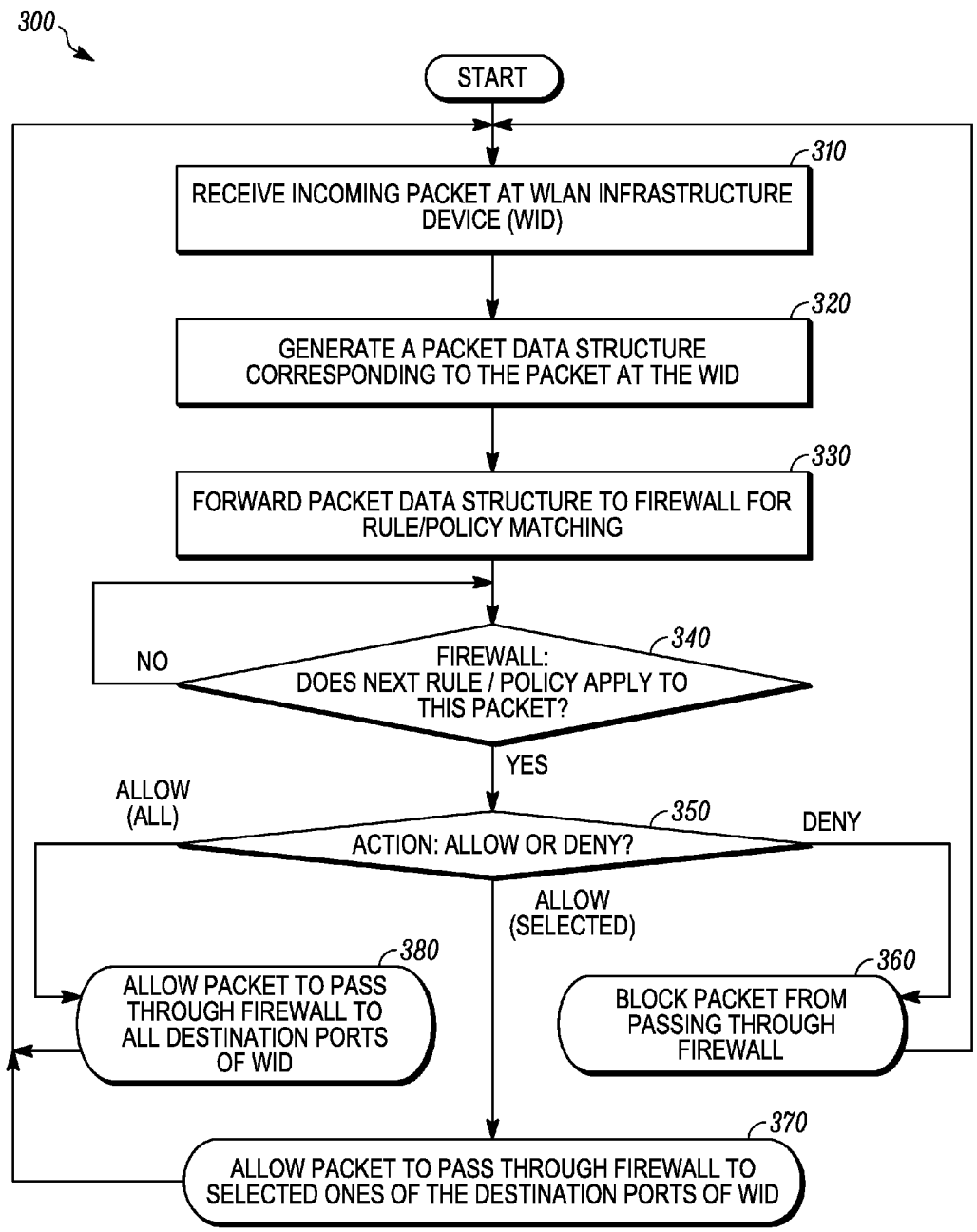
FIG. 3 is a flowchart illustrating a method for processing a packet at a firewall implemented in a WLAN infrastructure device (WID) in accordance with some embodiments.

FIG. 3 is a flowchart illustrating a method 300 for processing a packet at a firewall implemented in a WLAN infrastructure device (WID) in accordance with some embodiments. Method 300 is applied to any incoming packets that are received by the WID. The WID can be a wireless switch or an access point.

At step 310, the WID receives an incoming packet. At step 320, the WID generates, from the packet, a packet data structure that corresponds to the packet. The packet data structure includes pointers to different information about the packet. A pkt→data pointer is set to point to the actual contents of the packet. A pkt→ingress_port pointer is set to point to the port (or radio) structure on which the packet was received. A pkt→wcd pointer is set to point to a Wireless Client Device structure if the packet was received from a Wireless Client Device. A pkt→wcd→wlan pointer is set to point to a WLAN structure to which the WCD is associated. The WLAN structure contains information about the SSID and its related settings. A packet processor module at the WID executes packet processing code that operates on the packet data structure, where operations include L2 bridging, L3 routing and firewalling.

At step 330, the WID forwards the packet data structure to the firewall for inspection and rule matching. During rule matching, the firewall determines an appropriate rule to apply to the packet based on information in the packet data structure. Among other things, the firewall determines (e.g., infers) whether an ESSID is implicated with the packet based on information the WID and firewall maintains for each WCD. In this regard, the ESSID is not part of the packet, but is inferred by the WID based on information it maintains for each WCD.

At step 340, the rule matching processor of the firewall determines whether a next or current rule in a set of rules applies to the packet based on the information about the packet that is specified in the packet data structure. In other words, the firewall tries to match the packet with an applicable one of the firewall rules by determining whether each rule applies to the packet. As will be described below with reference to step 340, the rule matching processor selects the rules in the order they are specified in and picks the first matching rule and applies the action specified in that rule.

When the rule matching processor determines that the current rule does not apply to the packet, the method 300 loops back to step 340, where the firewall rule matching processor of the firewall determines whether a next or current rule/policy in a set of rules applies to the packet based on the information about the packet that is specified in the packet data structure.

By contrast, when the rule matching processor determines that the current rule applies to the packet, the method 300 proceeds to step 350, where the firewall determines, in accordance with the action specified by the current rule, whether to take an allow or deny action with respect to the packet. In the most basic embodiment, the firewall can either allow the packet or deny the packet. In one embodiment of step 350, the firewall determines, based on the rule that applies to the packet, whether to: (1) allow the packet to pass through the firewall to a particular egress port of the WID, (2) allow the packet to pass through the firewall to all egress ports of the WID (usually for broadcast and multicast packets), (3) allow the packet to pass through the firewall to selected egress ports of the WID or (4) deny/block the packet from passing through the firewall.

When the firewall determines that the packet should not be allowed to pass through the firewall, the firewall denies/blocks the packet from passing through the firewall at step 360.

When the firewall determines that the packet should be allowed to pass to selected ones of egress ports of the WID, the firewall allows the packet to pass through the firewall to the selected ones of the egress ports of the WID at step 370.

When the firewall determines that the packet should be allowed to pass to all egress ports of the WID, the firewall allows the packet to pass through the firewall to all egress ports of the WID at step 380.

For instance, in one embodiment, a network administrator can define firewall rules where either the source address or the destination address of the packet can be specified as an Extended Service Set IDentifier (ESSID) of a WLAN. An ESSID is an identifying name of a WLAN that allows one WLAN to be clearly distinguishable from another WLAN. The ESSID is a 32-character maximum string and is case-sensitive. An ESSID can be used to specify a set of interconnected BSSIDs. The ESSID of a mobile wireless client device must match the ESSID of the AP to communicate with the AP. For example, if there is a WLAN with the ESSID named "M-Wireless," then a firewall policy could be defined or specified as shown in Table 2 below.

TABLE 2

| Rule Number | Source | Destination | Protocol and (destination port) | Action |
|---|---|---|---|---|
| 1 | M-Wireless | any | HTTP (80) | allow |
| 2 | any | M-Wireless | SSH (22) | deny |
| 3 | 10.10.1.0/24 | any | HTTP (80) | allow |
| 4 | M-Wireless | 10.10.2.0/24 | SSH (22) | allow |
| 5 | any | any | any | deny |
| n | ... | ... | ... | ... |

The firewall policy in Table 2 includes a rule number column, a source address column, a destination address column, a protocol column (that list the corresponding destination port of that protocol), and an action column. Each rule specifies an action (specified in the action column) to be taken by the firewall with respect to a packet that is of a certain protocol (specified in the protocol column with its corresponding destination port) from a source address (specified in the source address column) to a destination address (specified in the destination address column)

In this example, rule number 1 will apply to packets with a source address that specifies the WLAN with the ESSID named "M-Wireless", any destination address and destination port 'HTTP' (TCP port 80). In other words, rule number 1 specifies that the firewall is to allow HTTP packets from the WLAN with the ESSID named "M-Wireless" to pass to any destination address.

By contrast, rule number 2 will apply to packets with any source address that are transmitted in accordance with the SSH protocol to a destination address that specifies the WLAN with the ESSID named "M-Wireless", and these packets will be denied or blocked. In other words, rule number 2 specifies that the firewall is to deny SSH packets from any source address to pass to the WLAN with the ESSID named "M-Wireless".

Rule number 3 specifies that the firewall is to allow HTTP packets from network identified by address 10.10.1.0/24 to pass to any destination address.

Rule number 4 specifies that the firewall is to allow SSH packets from a WLAN with ESSID "M-Wireless" to pass to destination address 10.10.2.0/24.

Rule number 5 specifies that the firewall is to deny packets of any other protocol (and corresponding destination port) from any source address to pass to any destination address (i.e., drop everything else).

If these hypothetical rules/policies were in place, and the wireless switch receives a packet from a first Wireless client device (WCD1) associated to the WLAN M-Wireless with a source IP address of 20.20.20.1, a destination IP address of 10.10.2.1, and a destination port as 22 (which is the well-known port number for SSH), the firewall would process the packet data structure corresponding to that packet as follows.

First, the firewall would determine if rule number 1 applies and would determine that it does not since this rule applies to HTTP traffic.

The firewall would next determine if rule number 2 applies and would determine that it does not since the destination IP address is not the WLAN with the ESSID named "M-Wireless".

The firewall would then determine if rule number 3 applies and would determine that it does not since the source IP address is not 10.10.1.x and the destination port is not HTTP (80).

The firewall would then determine if rule number 4 applies and would determine that it does. First, to determine whether the packet is from the WLAN with the ESSID named "M-Wireless", the firewall checks if the packet is from a WCD and will determine that it is because the pointer pkt→wcd will be non-NULL which means that the packet is indeed from a WCD. Next the firewall looks up the pointer pkt→wcd→wlan to determine whether the ESSID of the WLAN is "M-Wireless," and will determine that it is. Next the firewall will determine that the destination address of 10.10.2.1 is a member of 10.10.2.0/24 network, and will then determine that the destination port of SSH (22) also matches. Therefore the firewall will determine that rule number 4 is a match and it will take the corresponding action of "allow" (i.e., will allow the packet to pass through the firewall).

The ability to specify firewall policies and rules using WLAN parameters, such as ESSID, has a number of potential applications one of which will now be described.

Firewall-Assisted Selective Flooding of Packets to Wired Ports

A conventional stateful firewall does not take into account the fact that flooding packets is much more costly (i.e., in terms of degraded performance) on a wireless medium than on a wired medium.

In many cases it is desirable and/or necessary to send certain types of packets out on all wired ports. For example, broadcast packets, such as Virtual Router Redundancy Protocol (VRRP) packets, Hot Standby Router Protocol (HSRP) packets, or Network Basic Input/Output System (NetBios) packets, are needed on the wired side for normal operation, but are not needed on the wireless side.

Uncontrolled flooding of broadcast or multicast packets over a wireless link can consume significant over-the-air resources which can degrade performance significantly given the shared half duplex nature of the medium. As such, it is desirable to prevent such packets from being passed to wireless ports and going over the air since they are not needed and consume valuable over-the-air resources.

Figure 4A:
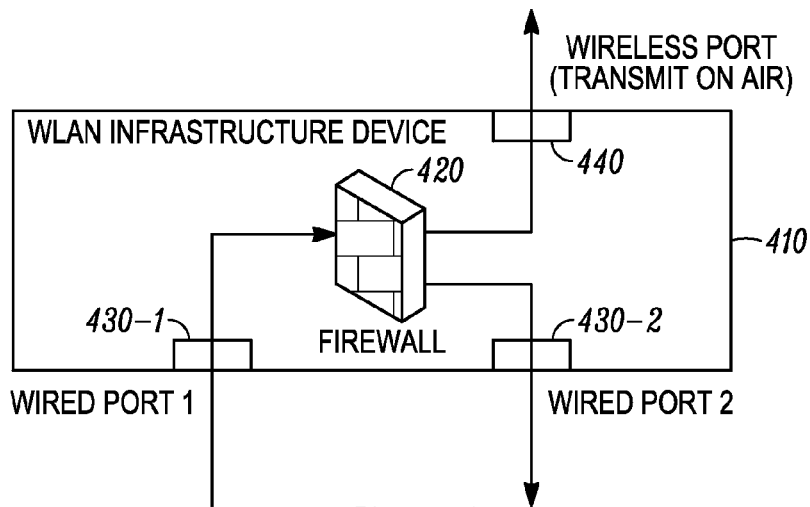
FIGS. 4A and 4B illustrate a WLAN infrastructure device that implements a conventional firewall.
Figure 4B:
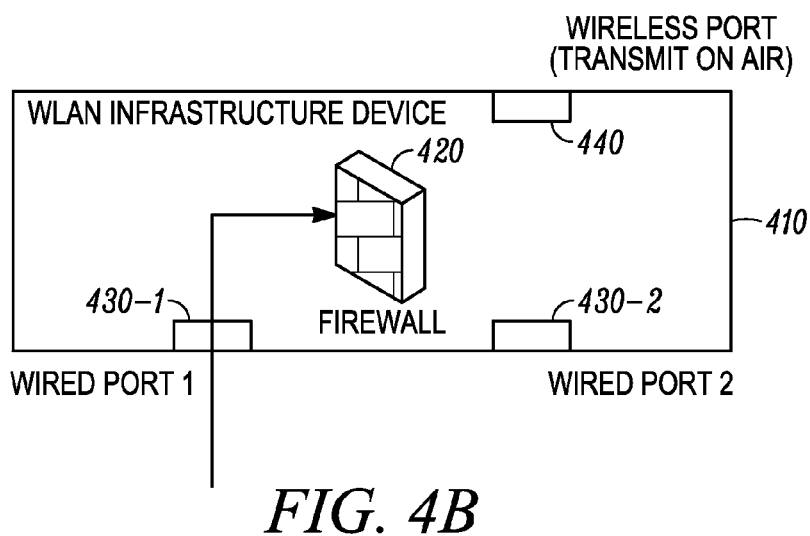

FIGS. 4A and 4B illustrate a WLAN infrastructure device 410 that implements a conventional firewall 420. For simplicity of illustration, the WLAN infrastructure device 410 is illustrated as including one wired ingress port 430-1, one wired egress port 430-2 and one wireless egress port 440; however, those skilled in the art will appreciate that a wireless infrastructure device may have multiple wired ingress ports, multiple wired egress ports and multiple wireless egress ports. The conventional firewall 420 implements conventional firewall rules that either allow a broadcast/multicast packet to pass through the firewall 420 to all wired ports (e.g., wired port 430-2) and to all wireless ports (e.g., wireless port 440), as illustrated in FIG. 4A, or drop the broadcast/multicast packet and do not allow the packet to pass through the firewall to wired ports (e.g., wired port 430-2) or the wireless ports (e.g., wireless port 440), as illustrated in FIG. 4B. There is no mechanism for instructing the firewall 420 to allow the packet to be sent only to wired ports (e.g., wired port 430-2) but not to the wireless ports (e.g., wireless port 440) (or vice-versa). Thus, it would be desirable to have a mechanism for allowing broadcast/multicast packets to be passed on to wired ports (e.g., wired port 430-2), but be blocked from going to wireless ports (e.g., wireless port 440) (or vice-versa).

One approach for handling broadcast/multicast packets at a firewall is to (1) create separate firewall policies for wired traffic and for wireless traffic, and then (2) apply one policy to wired traffic on wired ports and apply another separate policy to wireless traffic at wireless ports. However, with this approach the packet goes through multiple lookups. If a packet is being flooded, each copy of the packet goes through its own lookup based on the egress port or WLAN. For example, if separate policies are used per wired port and WLAN, then this means that for a packet that is ingressing on port 1 and being flooded out on port 2 and WLAN 3, the firewall rules on port 1, port 2 and WLAN 3 have to be looked up separately. In addition, there is significant administrative overhead involved in creating separate firewall policies for each wired port and each wireless LAN port and also having to map devices in the WLAN to a corresponding IP or MAC address to enforce the policy.

Figure 5:
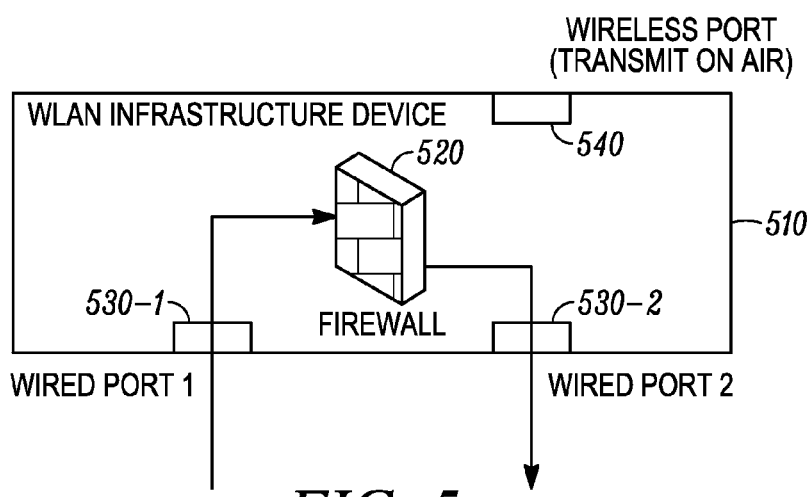
FIG. 5 illustrates a WLAN infrastructure device that implements a firewall in accordance with some of the disclosed embodiments.

FIG. 5 illustrates a WLAN infrastructure device 510 that implements a firewall 520 in accordance with some of the disclosed embodiments. Firewall rules at the firewall 520 are specified using WLAN parameters. As illustrated in FIG. 5, this allows a network administrator to define a policy that allows passage of a packet to wired port 530-2 so that a packet is flooded on wired ports, but denies passage of the packet to wireless port 540 so that the packet is not flooded on wireless ports and over the air. The firewall determines an action to take with respect to the packet based on the appropriate rule to apply to the packet. In one implementation, the firewall allows the packet to pass through the firewall to wired destination ports of the WID, and will also either (1) allow the packet to pass through the firewall to wireless egress ports of the WID or (2) deny/block the packet from passing through the firewall to wireless egress ports of the WID. An example will now be described with regard to a policy that is illustrated below in Table 3.

TABLE 3

| Rule Number | Source | Destination | Protocol | Action |
|---|---|---|---|---|
| 1 | any | M-Wireless | VRRP | deny |
| 2 | any | any | VRRP | allow |
| ... | ... | ... | ... | ... |

In this example, the network administrator has configured a rule which essentially says "drop Virtual Router Redundancy Protocol (VRRP) packets destined to the ESSID named 'M-Wireless'." Here, VRRP packets (i.e., packets that are transmitted in accordance with the VRRP) will be blocked by the firewall from being sent out on the ESSID named 'M-Wireless'. In other words, the firewall policy says that VRRP packets should not be sent to wireless egress port 540 for a WLAN named M-Wireless. However, as indicated in the third row of Table 3, the VRRP packets are permitted to pass through the firewall to wired ports 530-2. When a VRRP packet is processed by the firewall, it looks up the firewall rules one by one looking for a match. Rule 1 is a partial match since "source=any" and "Protocol=VRRP" match the packet, but "Destination=M-Wireless" cannot be determined yet. So the firewall adds information to the packet data structure indicating that the packet should not be flooded on "M-Wireless." The firewall then moves on to the rule #2. Rule #2 matches the packet and the action is "allow." So the firewall hands over the packet structure to the packet forwarding engine. The packet forwarding engine honors the information added by the firewall to the packet data structure instruction it not to flood this packet to "M-Wireless." It will only flood the packet to other ports and not to "M-Wireless." Thus, although VRRP uses multicast packets which are normally flooded on all wired and wireless ports, here a firewall rule can be defined such that multicast packet are flooded only on the wired side, and are not flooded on the wireless side.

Preventing Malicious WCDs from Using Over the Air (OTA) Resources

A conventional stateful firewall processes incoming packets and allows or denies them based on the firewall policy. Although dropping packets from a malicious wireless client device at the AP or wireless switch protects the network behind it, the malicious wireless client device has already used up a lot of available over-the-air bandwidth, which effectively denies service to other client devices of the wireless LAN.

In accordance with some of the disclosed embodiments, a firewall is provided that includes a Denial of Service (DoS) attack module that supports wireless specific actions, such as deauthentication, with respect to a malicious wireless client device. When the firewall detects a malicious WCD that is sending undesirable traffic (e.g., based on known attack signatures or the amount of traffic or the type of traffic that the attacker is generating), the firewall instructs the WS/AP to send the malicious WCD a deauthentication (DEAUTH) frame to remove malicious WCD from the network. The firewall also "blacklists" the malicious WCD for a time period while the WS/AP authenticates the malicious WCD. For instance, during an ICMP flood or sending unlimited packets by a ping command (also known as a SMURF attack), when a SMURF attack frame is received, the firewall can drop the packet, log it and then deauthenticate the WCD that sent the SMURF attack frame and blacklist the WCD for 10 minutes to prevent the WCD from sending other SMURF attack packets for 10 minutes. As used herein, the term "blacklist" refers to a list of WCD MAC addresses that the WID will not accept association from. Without associating, the WCD cannot send any traffic through the WID. As a result, the malicious client wireless device is effectively banned from the network and prevented from joining the network for some pre-determined amount of time. This can prevent L2/L3 attack tools that need a link to be established in order to send traffic. By blacklisting the mobile unit, a wireless link with the WCD will not be "up."

Figure 6:
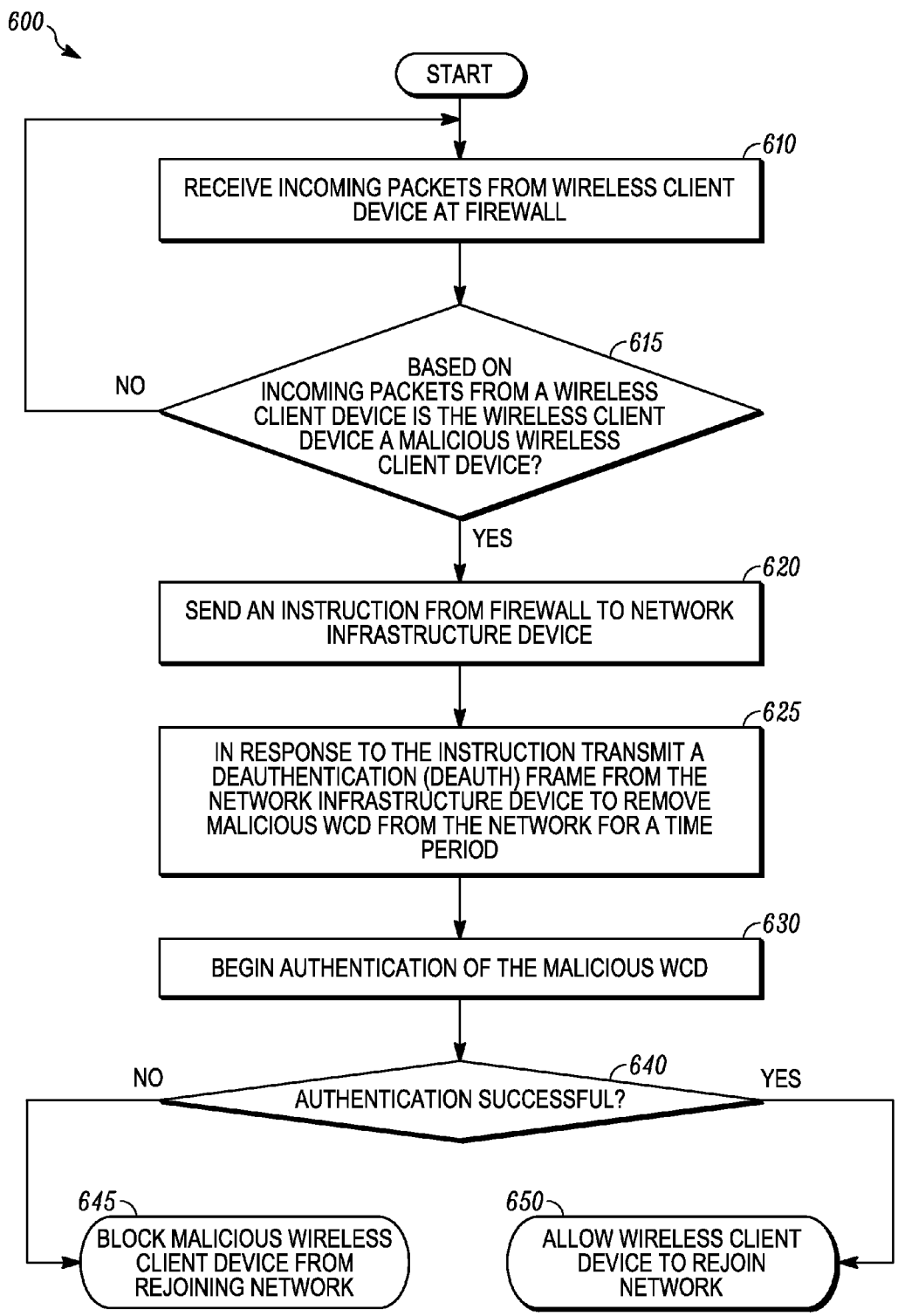
FIG. 6 is a flowchart illustrating a method for preventing malicious wireless client device from using radio frequency (RF) bandwidth resources in accordance with some embodiments.

FIG. 6 is a flowchart illustrating a method 600 for preventing malicious wireless client device from using RF bandwidth resources in accordance with some embodiments.

At step 610, a firewall receives incoming packets from a wireless client device. In this embodiment, the firewall can be implemented at wireless switch or at an access point.

At step 615, the firewall processes the incoming packets in accordance with a firewall policy to determine whether the wireless client device is a "malicious" wireless client device. For instance, in one embodiment, the firewall policy determines whether the incoming packets have a known attack signature, and if so, determines that the wireless client device is a malicious wireless client device. Examples of a known attack signatures can include, for example, any known type of denial-of-service (DoS) attack such as ICMP floods, Teardrop Attacks, Peer-to-peer attacks, Permanent denial-of-service attacks, Application level floods, Nuke, Distributed attacks, Reflected attacks, and degradation-of-service attacks. An example of an ICMP flood is a SMURF attack or sending unlimited packets by a ping command (e.g., destination address of ICMP ping is a broadcast address; also known as ICMP flood), etc. In another embodiment, the firewall policy determines whether the incoming packets correspond to a certain type of traffic, and if so, determines that the wireless client device is a malicious wireless client device. In another embodiment, the firewall policy determines whether the incoming packets exceed a predetermined amount of traffic, and if so, determines that the wireless client device is a malicious wireless client device.

When the firewall determines that the wireless client device is not a malicious wireless client device, the method 600 loops back to step 610, where the firewall continues to process the incoming packets in accordance with a firewall policy.

When the firewall determines that the wireless client device is a malicious wireless client device, the method 600 proceeds to step 620, where the firewall sends an instruction to a network infrastructure device (e.g., wireless switch or an access point).

In response to the instruction, at step 625, the network infrastructure device transmits a deauthentication (DEAUTH) frame to remove malicious wireless client device from the network and to prevent the malicious wireless client device from rejoining the network for a time period while the network infrastructure device authenticates the malicious wireless client device.

At step 630, the network infrastructure device begins an authentication process to attempt to authenticate the malicious wireless client device. In one embodiment, step 630 can take place simultaneously with sending the deauthentication (DEAUTH) frame.

At step 640, the network infrastructure device determines whether authentication of the malicious wireless client device was successful.

When the network infrastructure device determines that authentication of the malicious wireless client device was not successful, the method 600 proceeds to step 645, where the network infrastructure device blocks the malicious wireless client device from joining the network.

When the network infrastructure device determines that authentication of the malicious wireless client device was successful, the method 600 proceeds to step 650, where the network infrastructure device allows the malicious wireless client device to join the network.

State Synchronization

Traditional wired firewalls implement a full state synchronization mechanism to ensure that all routers and switches have state information for a particular client. This can be impractical in the context of a WLAN because it can lead to significant overhead in communicating all of the state information between devices.

When a wireless client device roams between WIDs (e.g., from one AP to another, or from one wireless switch to another), state information concerning firewall sessions associated with that WCD must also be moved between APs to maintain the WCD's connectivity state. It would be desirable to provide improved techniques for handling synchronizing state information concerning firewall sessions associated with that WCD so that the WCD can seamlessly roam from one AP to another while maintaining the "statefulness" of existing firewall sessions.

Predictive Migration of Firewall Sessions to Neighboring APs

Figure 7:
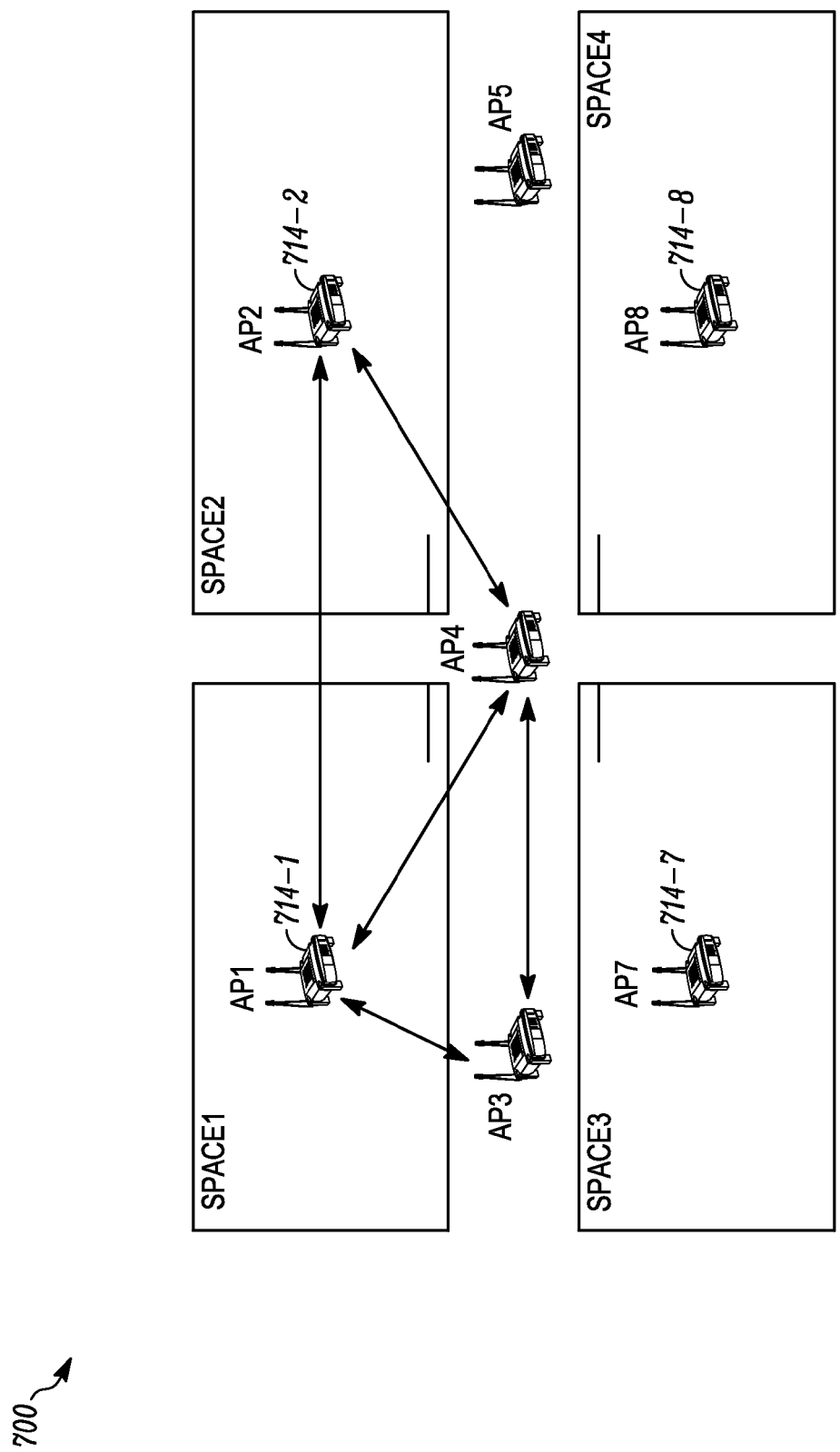
FIG. 7 is a block diagram illustrating a layout of access points in a geographic space.

In many environments, movements of a wireless client device follow a predictable pattern. As illustrated in FIG. 7, in a building the pattern of movement of a WCD can be constrained by location of doors, corridors, etc. As such, in many environments, a WCD will move around in a predictable pattern (as illustrated by the arrows in FIG. 7). This also results in a predictable pattern of roaming behavior between APs. In accordance with the disclosed embodiments, to exploit such predictable roaming patterns, a method for predictive firewall session migration is provided to handle roaming while maintaining the stateful nature of firewall sessions.

Figure 8:
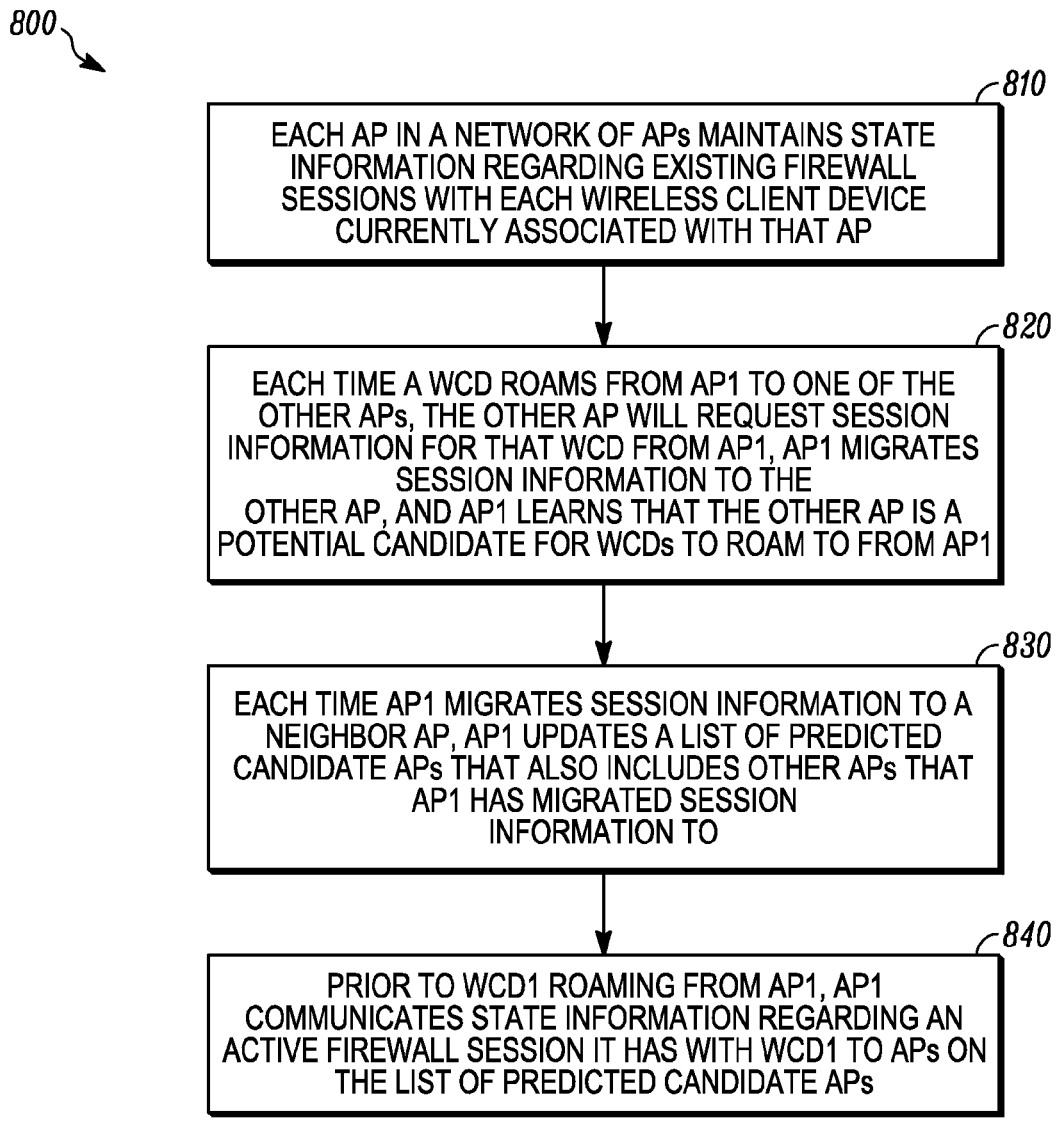
FIG. 8 is a flowchart illustrating a method for predictive firewall session migration in accordance with some embodiments.

FIG. 8 is a flowchart illustrating a method 800 for predictive firewall session migration in accordance with some embodiments. Method 800 can be used to predicatively communicate state information regarding existing firewall sessions between a first access point that a wireless client device is currently associated with and other access points in network of access points.

At step 810, each access point in a network of access points maintains state information regarding an existing firewall sessions associated with each wireless client device that is currently associated with that access point. The state information regarding existing firewall sessions includes transmission control protocol (TCP) state information for firewall sessions, user datagram protocol (UDP) state information for firewall sessions, Internet Control Message Protocol (ICMP) state information for firewall sessions, Dynamic Host Configuration Protocol (DHCP) and Internet Group Management Protocol (IGMP) snooping information for WCD1, etc. The state information for existing firewall sessions can include state information used to characterize the state of each connection. The state information used to characterize the state of each connection varies depending on the type of connection.

For TCP, the connection is established as follows: (1) client sends SYN packet, (2) server responds with SYN-ACK packet, and (3) client sends ACK packet. The client and server can then send data packets to each other. After the SYN, only legal packet is the SYN-ACK from server to client. Similarly, after the SYN-ACK, only legal packet is ACK from client to server. The firewall keeps track of the state of the connection. Based on the current state of the connection, the firewall makes sure that only valid packets are passed through. Thus, for a TCP connection the state information used to characterize the state of the TCP connection includes: TCP state (SYN_SENT, SYN_RECEIVED, ESTABLISHED, FIN_WAIT_1, FIN_WAIT_2, TIME_WAIT), TCP sequence numbers in both directions, SYN cookie info (when SYN cookies are being used), accounting information (session start time, end time, bytes transferred), the last packet seen time (for timing out idle connection) and the timeout period.

For a UDP connection and ICMP sessions session table entries include the state information used to characterize the state of the UDP connection. A session table entry comprises the source MAC address, destination MAC address, source IP address, destination IP address, source port, destination port, protocol, ingress VLAN and ingress port, accounting information (packets and bytes sent), the timeout period, etc.

At step 820, each time a WCD roams from AP1 to one of the other APs, the other AP will request session information for that WCD from AP1. AP1 migrates session information to the other AP that sent a request for session information to AP1. For example, when a WCD roams from AP1 to AP2, AP2 will not have any session table entries for that WCD, and AP2 will send a request to AP1 for the session information. From this request, AP1 learns that AP2 is a potential candidate for WCDs to roam to from AP1.

At step 830, each time AP1 migrates session information to a neighbor AP, AP1 updates a list of predicted candidate APs. The list of predicted candidate APs is a list of the other APs that AP1 has migrated session information to. This way AP1 (and all other APs) can keep track of roaming information for each WCD that associates with the AP1 and then roams away from AP1 to another AP, where the roaming information identifies the neighbor AP(s) that WCDs roamed to after being associated with AP1. Thus, over a period of time, AP1 learns of and compiles a list of predicted candidate APs in the neighborhood that WCDs (that were once associated with AP1) have roamed to. Stated differently, AP1 derives the list of predicted candidate APs that WCDs (that are currently associated to AP1) are likely to roam to from AP1 based on the roaming history of other WCDs that that have roamed away from AP1. This way, AP1 can predict, based on the roaming patterns of other WCDs (that have been associated with it and then roamed away), that a particular WCD1 currently associated with AP1 will also likely roam to one of the other APs on the list of predicted candidate APs (i.e., will roam to the same APs that the other WCDs have roamed to). For example, in the example of FIG. 4, a particular AP (e.g., AP1) can determine or predict, based on observed roaming behaviors of other WCDs that are represented in the list of predicted candidate APs, that WCD1 will likely roam to either AP2, AP3 or AP4 (as indicated by arrows) from AP1, but never roams to AP5, AP6, AP7, AP8.

At step 840, prior to WCD1 roaming from the AP1 to another AP on the list of predicted candidate APs, AP1 communicates (i.e., pushes or "preemptively migrates") state information regarding an existing firewall session associated with the WCD1 to the APs on the list of predicted candidate APs so that state information regarding the existing firewall session associated with WCD1 can also be maintained at the APs on the list of predicted candidate APs. AP1 can do this for each WCD that is currently associated with AP1, and other APs can do the same. For example, each AP can determine which WCDs it currently has an active firewall session with, and for each of the WCDs it currently has an active firewall session with can then also determine predicted neighbor APs for that WCD (i.e., the APs on the list of predicted candidate APs that the WCD is likely to roam to based on roaming patterns determined at step 830). Each AP can then send state information for each of the WCDs it currently has an active firewall session with to the predicted neighbor APs on the list of predicted candidate APs.

This reduces the amount the information that has to be exchanged between APs since each AP pushes state information for firewall sessions to only the neighboring APs that the WCD is likely to roam to. This approach is better than trying to push state information blindly to all possible APs in a network of APs since state information will only be pushed to select ones of all of the APs on the list of predicted candidate APs. For instance, with respect to FIG. 4, when AP1 that has an active firewall session with WCD1, AP1 can preemptively push or "migrate" state information for its active firewall session with WCD1 to neighboring AP2, AP3 and AP4, but does not migrate state information to AP5, AP6 and AP7. As such, when WCD1 roams from AP1 to AP2, for example, AP2 will already have the state information firewall sessions in place and there is no additional delay associated with migrating the state information for the firewall session when WCD1 roams to AP2.

Preemptive migration also increases the efficiency in wireless switch based environments. For example if AP1, AP2, AP3 and AP4 are on the same wireless switch, the sessions on AP1 need not be synchronized between the wireless switches since the wireless switch knows it is very unlikely that WCD1 will roam from AP1 to an AP on another wireless switch.

On Demand Migration of Firewall Sessions

As an alternative to predictive firewall session migration or for use in conjunction with predictive firewall session migration, on demand firewall session migration can be implemented in accordance with other embodiments. In comparison to predictive firewall session migration, on demand firewall session migration can reduce the amount of information that must be exchanged between access points (i.e., two APs exchange only the minimum amount of information necessary). When on-demand migration is used in conjunction with predictive session migration, it acts as a fallback mechanism in the case where the WCD roams to an AP that was not in the expected list of APs and hence no preemptive session migration occurred.

Figure 9:
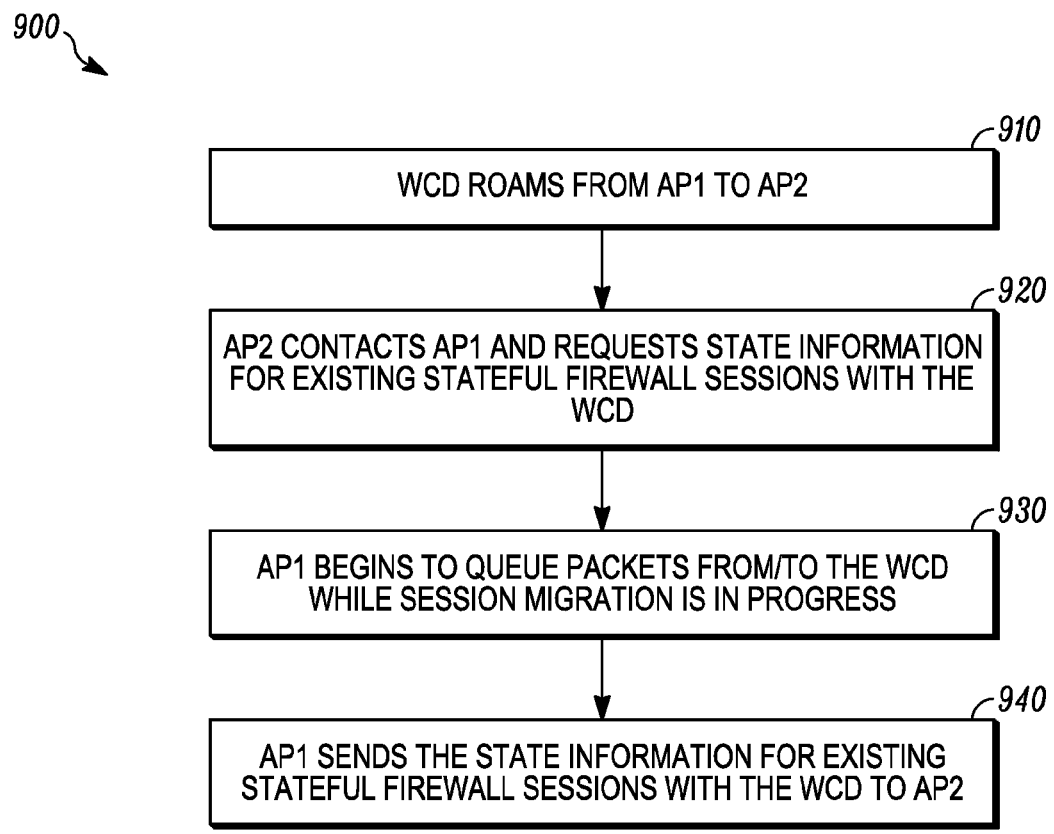
FIG. 9 is a flowchart illustrating a method for on demand firewall session migration in accordance with some embodiments.

FIG. 9 is a flowchart illustrating a method 900 for on demand firewall session migration that is used to communicating state information when a wireless client device roams from a first access point (AP1) to a second access point (AP2) in accordance with some embodiments.

At step 910, a WCD roams from AP1 to AP2. AP1 maintains state information regarding an existing firewall session associated with the WCD.

When the WCD roams from the AP1 to AP2, AP2 contacts AP1 and requests state information for existing stateful firewall sessions with the WCD at step 920. In other words, AP2 requests the state information regarding the existing firewall session associated with the wireless client device from AP1.

At step 930, AP1 begins to queue any packets from/to the WCD while session migration is in progress.

At step 940, AP1 communicates the state information regarding the existing firewall session associated with the WCD to AP2, and also sends any packets that have been queued. By communicating the state information from AP1 to the AP2, AP2 obtains up-to-date state information regarding the existing firewall session associated with the WCD.

In the foregoing specification, specific embodiments have been described. However, one of ordinary skill in the art appreciates that various modifications and changes can be made without departing from the scope of the invention as set forth in the claims below. For example, while the techniques and technologies described above have been described in the context of WLANs which in include wireless switches and access ports (APs), it will be appreciated that these techniques and technologies can also be applied in environments were wireless switches are not utilized or where the functionality of the wireless switch is implemented within an access point. For instance, these techniques and technologies can be applied in a network which does not include wireless switches—this case is identical to a Wireless switch with one AP merged together.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for preventing a malicious wireless client device from using radio frequency resources, the method comprising:
   processing incoming packets from a wireless client device at a firewall to determine whether the wireless client device is a malicious wireless client device that is transmitting undesirable traffic;
   sending an instruction from the firewall to a wireless local area network infrastructure device when the wireless client device is determined to be a malicious wireless client device; and
   transmitting, from the wireless local area network infrastructure device in response to the instruction, a deauthentication frame to remove the malicious wireless client device from the wireless local area network, and preventing the malicious wireless client device from rejoining the wireless local area network for a time period to prevent the malicious wireless client device from sending other packets during the time period;
   starting an authentication process at the wireless local area network infrastructure device to attempt to authenticate the malicious wireless client device;
   determining, at the wireless local area network infrastructure device, whether authentication of the malicious wireless client device was successful;
   blocking the malicious wireless client device from joining the wireless local area network when the wireless local area network infrastructure device determines that authentication of the malicious wireless client device is not successful; and
   allowing the malicious wireless client device to join the wireless local area network when the wireless local area network infrastructure device determines that authentication of the malicious wireless client device is successful.

2. A method according to claim 1, wherein the step of processing incoming packets from a wireless client device at a firewall to determine whether the wireless client device is a malicious wireless client device, comprises:
   processing incoming packets from the wireless client device at the firewall to determine whether the wireless client device is a malicious wireless client device; and
   determining that the wireless client device is a malicious wireless client device when the incoming packets are multicast/broadcast traffic.

3. A method for predicatively communicating state information regarding existing firewall sessions between a first access point that a particular wireless client device is currently associated with and other access points in network of access points, comprising:
   maintaining at, each access point in a network of access points, state information regarding existing firewall sessions associated with each wireless client device that is currently associated with that access point;

updating, at the first access point each time the first access point migrates session information to a neighbor access point, a list of predicted candidate access points based on roaming information of each wireless client device; and communicating, from the first access point to the predicted candidate access points on the list of predicted candidate access points, state information regarding an existing firewall session associated with the particular wireless client device that the first access point has an active firewall session with;

predicting, at the first access point based on roaming patterns of other wireless client devices that have been associated with the first access point and then roamed away, that the particular wireless client device currently associated with first access point will also roam to one of the other access points on the list of predicted candidate access points, wherein the step of predicting occurs prior to the particular wireless client device roaming from the first access point to another access point on the list of predicted candidate access points so that state information regarding the existing firewall session associated with the particular wireless client device can also be maintained at selected access points of the network of access points that are in the list of predicted candidate access points.

4. A method according to claim 3, wherein the step of updating, at a first access point each time the first access point migrates session information to a neighbor access point, a list of predicted candidate access points, comprises:

deriving roaming information learned by the first access point based on a roaming history of other wireless client devices that that have roamed away from the first access point; and maintaining, the list of predicted candidate access points over time at the first access point based on roaming information learned by the first access point by updating the list of predicted candidate access points maintained in storage at the first access point based on roaming information learned by the first access point.

5. A method according to claim 3, wherein the list of predicted candidate access points identifies particular ones of the other access points in the network of access points that the first access point has migrated existing firewall session information to when wireless client devices associated with the first access point have roamed to the other access points after being associated with the first access point, and wherein the list of predicted candidate access points identifies particular ones of the other access points in the network of access points that wireless client devices currently associated to the first access point are likely to roam to from the first access point.

6. A method according to claim 3, further comprising:

requesting, from one of the other access points each time the wireless client device roams from the first access point to one of the other access points, existing firewall session information for that wireless client device from the first access point, wherein the existing firewall session information comprises session table entries for the wireless client device; and sending requested existing firewall session information, from the first access point to the other access point that have sent a request for existing firewall session information to first access point.

7. A method according to claim 6, further comprising:

determining, at the first access point based on a request from a second access point for the existing firewall session information, that the second access point is a potential candidate for wireless communication devices to roam to from first access point.

8. A method according to claim 3, wherein the state information regarding an existing firewall session comprises:

state information used to characterize the state of each connection.

9. A method according to claim 8, wherein the state information regarding an existing firewall session comprises one or more of: transmission control protocol (TCP) state information for the existing firewall session, user datagram protocol (UDP) state information state information for the existing firewall session, Internet Control Message Protocol (ICMP) state information for the existing firewall session, Dynamic Host Configuration Protocol (DHCP) state information for the particular wireless communication device for the existing firewall session, Internet Group Management Protocol (IGMP) state information the particular wireless communication device for the existing firewall session.

* * * * *